United States Patent
Li et al.

(10) Patent No.: US 10,389,710 B2
(45) Date of Patent: Aug. 20, 2019

(54) METHOD AND SYSTEM FOR EXTRACTING CHARACTERISTIC INFORMATION

(71) Applicant: Alibaba Group Holding Limited, George Town (KY)

(72) Inventors: Xiaoling Li, Hangzhou (CN); Junkui Li, Hangzhou (CN); Jupeng Xia, Hangzhou (CN); Yan Hu, Shanghai (CN)

(73) Assignee: Alibaba Group Holding Limited (KY)

( * ) Notice: Subject to any disclaimer, the term of this patent is extended or adjusted under 35 U.S.C. 154(b) by 105 days.

(21) Appl. No.: 14/622,672

(22) Filed: Feb. 13, 2015

(65) Prior Publication Data

US 2015/0249665 A1    Sep. 3, 2015

(30) Foreign Application Priority Data

Feb. 28, 2014    (CN) .......................... 2014 1 0072629

(51) Int. Cl.
| | |
|---|---|
| *G06F 7/04* | (2006.01) |
| *G06F 17/30* | (2006.01) |
| *H04N 7/16* | (2011.01) |
| *H04L 29/06* | (2006.01) |
| *H04L 29/08* | (2006.01) |
| *G06F 21/32* | (2013.01) |

(52) U.S. Cl.
CPC .......... *H04L 63/0861* (2013.01); *G06F 21/32* (2013.01); *H04L 67/10* (2013.01)

(58) Field of Classification Search
CPC ................................................ H04L 63/0861
See application file for complete search history.

(56) References Cited

U.S. PATENT DOCUMENTS

| | | | |
|---|---|---|---|
| 6,993,659 B2* | 1/2006 | Milgramm | G06F 21/32 |
| | | | 340/5.52 |
| 7,200,753 B1 | 4/2007 | Takashi et al. | |
| 7,392,939 B2 | 7/2008 | Hauke et al. | |

(Continued)

FOREIGN PATENT DOCUMENTS

| | | |
|---|---|---|
| DE | 19921387 | 11/2000 |
| EP | 0935221 | 8/1999 |

(Continued)

OTHER PUBLICATIONS

Author: Wirtz, Brigitte, Title: Device and Method for Comparing Biometric Data, Feb. 2, 2006, Translation of German pattent publication DE 19921387.*

(Continued)

*Primary Examiner* — Mahfuzur Rahman
*Assistant Examiner* — Darshan I Dhruv
(74) *Attorney, Agent, or Firm* — Van Pelt, Yi & James LLP

(57) ABSTRACT

Extracting characteristic information includes receiving a collection command from a client, obtaining, via a collection device, biometric information based on the collection command, selecting a stored extraction algorithm corresponding to the client, the stored extraction algorithm being selected from among a plurality of stored extraction algorithms, extracting characteristic values from the obtained biometric information, the characteristic values being extracted based on the selected extraction algorithm, and sending the extracted characteristic values to the client.

10 Claims, 7 Drawing Sheets

(56) References Cited

U.S. PATENT DOCUMENTS

| | | | |
|---|---|---|---|
| 7,809,168 B2 | 10/2010 | Abiko et al. | |
| 7,819,322 B2* | 10/2010 | Hammad | G06Q 20/085 235/380 |
| 8,063,889 B2 | 11/2011 | Anderson | |
| 9,294,452 B1 | 3/2016 | Jakobsson | |
| 2001/0000045 A1* | 3/2001 | Yu | G06F 21/32 |
| 2002/0194003 A1* | 12/2002 | Mozer | G06F 21/32 704/270.1 |
| 2003/0105966 A1* | 6/2003 | Pu | G06F 21/31 713/186 |
| 2005/0084139 A1* | 4/2005 | Kyle | G06K 9/00221 382/115 |
| 2006/0056662 A1* | 3/2006 | Thieme | G06K 9/00067 382/115 |
| 2007/0106895 A1* | 5/2007 | Huang | H04L 9/0866 713/170 |
| 2008/0095410 A1* | 4/2008 | Shalev | G06F 21/32 382/115 |
| 2008/0159598 A1* | 7/2008 | Iasso | G06K 9/00885 382/115 |
| 2009/0095810 A1* | 4/2009 | Cannon | G06K 7/0008 235/380 |
| 2009/0190802 A1* | 7/2009 | Adams | G07C 9/00087 382/115 |
| 2009/0271635 A1* | 10/2009 | Liu | G06F 21/32 713/186 |
| 2009/0289187 A1* | 11/2009 | Mian | G01S 17/89 250/330 |
| 2010/0223663 A1* | 9/2010 | Morimoto | G06F 21/32 726/7 |
| 2012/0042171 A1* | 2/2012 | White | G06F 21/32 713/186 |
| 2012/0239924 A1* | 9/2012 | Fedronic | G06F 21/32 713/153 |
| 2012/0281027 A1 | 11/2012 | Kim | |
| 2013/0036309 A1* | 2/2013 | Kevenaar | G06F 21/32 713/186 |
| 2013/0263238 A1* | 10/2013 | Bidare | G07C 9/00087 726/7 |
| 2014/0016833 A1* | 1/2014 | Ide | G06K 9/00926 382/115 |
| 2014/0333788 A1* | 11/2014 | Xiong | H04N 5/23245 348/220.1 |
| 2014/0347479 A1* | 11/2014 | Givon | G06K 9/00342 348/143 |
| 2014/0380040 A1* | 12/2014 | Albahdal | H04L 9/3247 713/155 |
| 2015/0007295 A1* | 1/2015 | Hou | H04L 9/3231 726/7 |
| 2015/0169860 A1* | 6/2015 | Kim | G06F 21/34 726/9 |
| 2015/0302060 A1* | 10/2015 | Thuillier | G06F 21/32 707/769 |
| 2016/0219046 A1* | 7/2016 | Ballard | H04L 63/0861 |

FOREIGN PATENT DOCUMENTS

| | | |
|---|---|---|
| EP | 1085454 | 3/2001 |
| JP | 2005056150 | 3/2005 |
| JP | 2005063246 | 3/2005 |
| JP | 2005149527 | 6/2005 |
| JP | 2014021800 | 2/2014 |

OTHER PUBLICATIONS

Alexej Kochetkov, Cloud-Based Biometric Services: Just a Matter of Time, Biometric Technology Today, May 2013, pp. 8-11.

* cited by examiner

200

500

METHOD AND SYSTEM FOR EXTRACTING CHARACTERISTIC INFORMATION

CROSS REFERENCE TO OTHER APPLICATIONS

This application claims priority to People's Republic of China Patent Application No. 201410072629.7 entitled A METHOD AND A DEVICE FOR EXTRACTING CHARACTERISTIC INFORMATION, filed Feb. 28, 2014 which is incorporated herein by reference for all purposes.

FIELD OF THE INVENTION

The present application relates to a method and system for extracting characteristic information.

BACKGROUND OF THE INVENTION

As Internet technology develops, users are able to transact various kinds of online activity via the Internet whenever and wherever they like. Because a great deal of online activity now involves user financial information (such as bank card numbers), security of user information has spurred an increase in the amount of current research.

Although most client providers use account numbers and passwords (including text passwords and gesture passwords) to verify user identities and thus ensure the security of user information, a risk that a password will be leaked or hacked exists. Therefore, methods to verify user identities based on biometric information of the users have arisen.

Conventionally, a client can collect a user's biometric information through a collection device in equipment where the collection device is located, extract characteristic values from the collected biometric information, and verify the user's identity based on the extracted characteristic values.

For example, when a user registers a shopping client account number via a cell phone, the shopping client collects the user's fingerprint, which serves as biometric information of the user, via a collection device of the cell phone, and extracts characteristic values from the collected fingerprint (biometric information). The cell phone can send the user's account number and the extracted characteristic values to a server for associated storage. The next time the user logs into an account, the user's fingerprint is again collected and the characteristic values extracted. The user's identity is verified based on the extracted characteristic values and the account number-related characteristic values stored in the server.

However, because the biometric information of the user, such as the fingerprint, is categorized as private user information, the equipment manufacturers typically will prohibit their equipment from directly providing collected biometric information to clients installed on the equipment to extract characteristic values. Therefore, conventionally, after the equipment collects the biometric information of the user, the equipment typically extracts the characteristic values of the biometric information based on a default extraction algorithm of the equipment and then provides the characteristic values to the client.

The equipment default extraction algorithm is typically hardwired into the equipment at the time the equipment is manufactured. The default extraction algorithms used in equipment of different equipment manufacturers are not always the same. Therefore, even if the fingerprints are from the same user, the characteristic values extracted using different extraction algorithms are to vary. As a result, different pieces of equipment are to extract different characteristic values from the same biometric information. Thus, after a user registers and stores the characteristic values of their biometric information based on one piece of equipment, on another piece of equipment, the user is unable to be verified and use the other piece of equipment normally. If the user wishes to use the account number on another piece of equipment, the user is to re-store the characteristic values of the biometric information based on the other piece of equipment.

For example, when a user registers a shopping client account number based on a cell phone, the client installed on the cell phone sends the account number and the fingerprint characteristic values extracted by the cell phone to a server for associated storage. When the user logs into the account using a personal computer (PC), characteristic values extracted by the PC are different from the characteristic values extracted by the cell phone because the PC and the cell phone implement different extraction algorithms. Therefore, after the PC sends the extracted characteristic values to a server, the server will determine that the characteristic values sent by the PC do not match the stored characteristic values associated with the account number because the stored characteristic values associated with the account number were extracted by the cell phone. Thus, the server is to refuse to let the user log into the account. If the user wishes to use the PC to log into the account, then the user is to reset the stored characteristic values associated with the account number in the server. In other words, the user resets the stored characteristic values associated with the account number in the server to the characteristic values extracted from the fingerprint by the PC. Subsequently, the user can then log into the account via the PC.

Since the default extraction algorithm of each type of equipment is different, the conventional characteristic information extraction method is inefficient for the users and wastes the network resources spent on resetting characteristic values.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
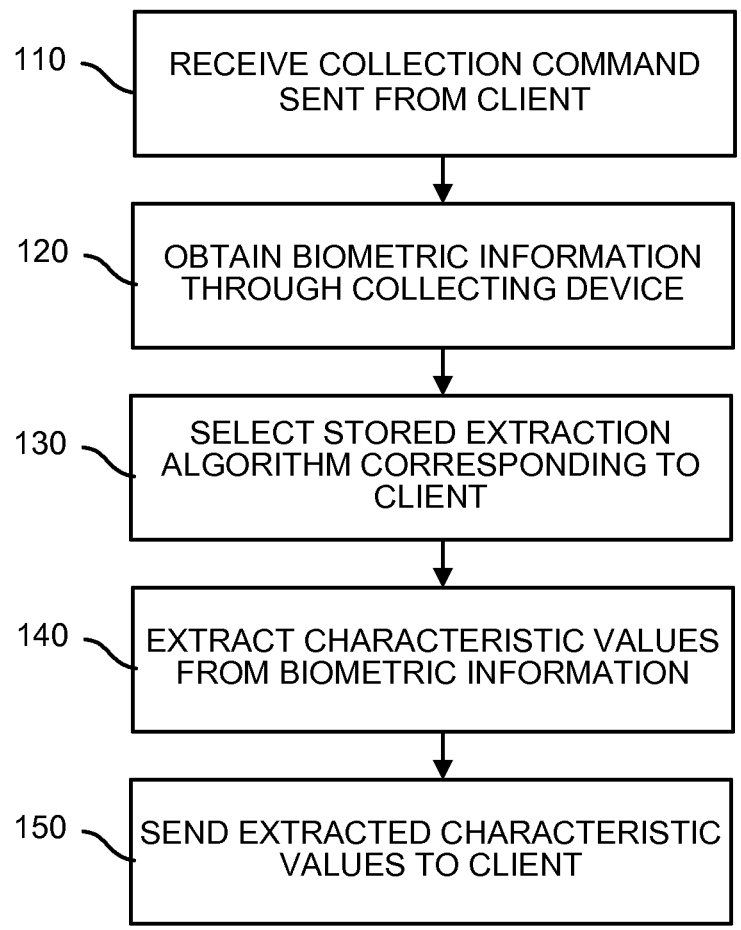
FIG. 1A is a flow diagram illustrating an embodiment of a process for extracting characteristic information.

FIG. 1A is a flow diagram illustrating an embodiment of a process for extracting characteristic information. In some embodiments, the process 100 is implemented by middleware 2220 of FIG. 2.

In 110, a collection command sent from a client is received.

In some embodiments, in addition to including a client installed on equipment and a collection device for collecting biometric information, the equipment used by the user also includes middleware. In some embodiments, the client is an application (app) installed on the equipment, such as a browser application, a standalone application, or the like. The middleware is independent of any client installed on the equipment. The middleware can be hardware (e.g., a chip) or software (e.g., an app).

When the client installed on the equipment is to use the user's biometric information, the client sends a collection command to the middleware of the equipment. In some embodiments, the collection command is a function call or operation supported by the operating system. The collection command includes identification information of the client, the type of biometric information to be gathered, the type of collection device, and/or other appropriate parameters according to pre-specified formats. In some embodiments, the client equipment includes various kinds of user equipment, such as cell phones, tablet computers, PCs, notebook computers, etc. In some embodiments, the biometric information includes fingerprints, voice prints, iris scans, etc. For example, when the biometric information corresponds to fingerprints, the collection device corresponds to a fingerprint collector; when the biometric information corresponds to voice prints, the collection device corresponds to a microphone; and when the biometric information corresponds to irises, the collection device corresponds to an iris scanner.

In another example, when a user registers a shopping client account number via a cell phone, the shopping client installed on the cell phone sends a collection command to the middleware of the cell phone.

In 120, the biometric information is obtained through a collection device based on the collection command.

In some embodiments, after the middleware receives a collection command from the client, the middleware obtains the biometric information of the user via the collection device of the equipment. For example, the middleware sends a collection command to the collection device of the equipment. After the collection device receives the collection command, the collection device executes one or more operations that collect the biometric information of the user and sends the collected biometric information back to the middleware. The middleware then receives the biometric information sent by the collection device and regards the received biometric information as the obtained biometric information.

For example, after the middleware in the cell phone receives the collection command sent by the shopping client, the middleware sends this collection command to a fingerprint collector in the cell phone. The fingerprint collector then collects the fingerprint of the user, which serves as collected biometric information, and sends the collected fingerprint back to the middleware. The middleware then regards the received fingerprint as the biometric information obtained from the user.

In 130, from among various stored extraction algorithms, the middleware selects a stored extraction algorithm corresponding to the client.

In some embodiments, the middleware of the equipment pre-stores extraction algorithms corresponding to various clients. In some embodiments, the extraction algorithms corresponding to the different clients are the same or different. In some embodiments, the extraction algorithm includes an image processing algorithm, a machine learning algorithm, a fuzzy matching algorithm, or any combination thereof. As an example, the extraction algorithm corresponds to a fingerprint extraction algorithm.

In some embodiments, after obtaining the user's biometric information via the collection device, the middleware, based on the client identifying information included in the collection command received in operation 110, selects an extraction algorithm corresponding to the identifying information. For example, the identifying information includes a serial number of a chip associated with the client equipment.

For example, the middleware performs a lookup on a lookup table including client identifying information and the corresponding extraction algorithm. Based on the obtained client identifying information, the middleware selects the corresponding extraction algorithm from the lookup table.

Furthermore, after the middleware obtains the fingerprint of the user, the middleware can, based on the client identifying information included in the collection command, select the extraction algorithm corresponding to the identifying information from among the various extraction algorithms that were stored and regard the selected extraction algorithm as the extraction algorithm corresponding to the shopping client.

In 140, the middleware extracts characteristic values from the biometric information based on the selected extraction algorithm.

In some embodiments, the extraction algorithm is used to extract the characteristic values from the biometric information. After the middleware selects the extraction algorithm corresponding to the client, the middleware can extract the characteristic values from the biometric information obtained in operation 120. Using a fingerprint as an example, the middleware extracts characteristic values relating to vectors made of geometric values and that correspond to fingerprint characteristic information such as a whorl's nth surface area, an arch line's fork, or an intersection distance.

In 150, the middleware sends the extracted characteristic values to the client.

After the client receives the characteristic values sent by the middleware, the client can send these characteristic values to the server for further processing such as storing or verifying.

Furthermore, after the middleware obtains the fingerprint (biometric information) of the user and selects the extraction algorithm corresponding to the shopping client, the middleware invokes the extraction algorithm corresponding to the shopping client to process the user's fingerprint that was obtained, extracts characteristic values of the fingerprint, and sends the extracted characteristic values to the shopping client. Because the user has a registered account on the shopping client, the shopping client can send the received characteristic values and the user's account number to the server to be stored.

Subsequently, for example, if the user logs into the account through a PC, the shopping client installed on the PC sends a collection command to the middleware of the PC. The middleware of the PC then obtains a fingerprint of the user through a fingerprint collector of the PC. The PC then selects the extraction algorithm corresponding to the shopping client and extracts the characteristic values from the fingerprint of the user based on the selected extraction algorithm.

Since the extraction algorithm corresponding to the shopping client is the same regardless of whether the shopping client is installed on a cell phone or on a PC, the characteristic values extracted from the user's fingerprint based on the extraction algorithm will also be the same.

Therefore, after the shopping client installed on the PC sends the extracted characteristic values to the server, the server can determine whether the received characteristic values match the stored characteristic values associated with the received account number. The stored characteristic values associated with the account number are extracted and sent by the cell phone to the server. Upon determining that a match has occurred, the server permits the user to log in.

Furthermore, the extraction algorithm is implemented by the middleware when the middleware extracts the characteristic values using the extraction algorithm corresponding to the client. Therefore, the characteristic values extracted by the same client (for example, the client corresponding to the same identifying information) from the same biometric information through different pieces of equipment will be the same. Thus, even with the precondition that the biometric information may not be provided directly to a client for use, the user can still transact business based on the user's biometric information on different pieces of equipment without having to reset the characteristic values stored in the server every time the user switches to a different piece of equipment. This process 100 of FIG. 1A increases the efficiency with which the user conducts business and conserves network resources that would otherwise be spent on resetting characteristic values.

In addition, the aforesaid process 100 for extracting characteristic values can be suited to various operating systems, such as embedded systems, Android systems, iOS systems, Windows systems, etc.

The above example corresponds to an example of a user registering an account and logging into a registered account. The process 100 for extracting characteristic information, shown in FIG. 1A, can also apply to other scenarios, such as identity verification at the time of an online shopping payment. In addition, the above example utilizes biometric information which corresponds to a fingerprint. The process 100 for extracting characteristic information, shown in FIG. 1A, can be applied to scenarios of other kinds of biometric information, such as sound, prints, irises, etc.

In some embodiments, the middleware of the equipment stores the extraction algorithms that correspond to various clients. For example, the middleware monitors client installations performed on the equipment where the middleware is located. When the middleware detects that the equipment on which the middleware is located has installed a new client, the middleware then acquires the extraction algorithm corresponding to this client and stores the extraction algorithm. Specifically, when the middleware detects that a client has been installed on the equipment, if the extraction algorithm corresponding to this client is not already downloaded and stored on the equipment, the middleware downloads and stores the corresponding extraction algorithm from a server. In some embodiments, the extraction algorithm corresponding to the client's identifying information is determined based on the identifying information of the installed client. In some embodiments, the middleware downloads and stores the extraction algorithm corresponding to the identifying information from a server provided by the equipment's manufacturer. The extraction algorithm that is downloaded can be a plug-in, a library, or other forms of executable or code implementing certain extraction operations.

For example, when a user downloads and installs a shopping client onto her cell phone, the middleware in the cell phone can download and store, based on the identifying information of the shopping client, an extraction algorithm corresponding to the shopping client from a server or from a server provided by the cell phone manufacturer.

In addition, when a client is installed on the equipment, the middleware can also temporarily wait to acquire the extraction algorithm corresponding to the client, and instead, upon receiving a collection command sent by the client, determine whether the middleware itself has the extraction algorithm corresponding to the client. If the middleware itself already has the extraction algorithm corresponding to the client, then the middleware is not to acquire the extraction algorithm and only perform subsequent operations of the process 100 of FIG. 1A. If the middleware itself does not have the extraction algorithm corresponding to the client, then the middleware can acquire and store, based on the identifying information of the client, the extraction algorithm corresponding to the client from a server corresponding to or a server provided by the equipment manufacturer.

The extraction algorithms corresponding to the various clients stored in the middleware can also be ones proactively injected into the middleware by the various clients and stored by the clients. For example, a client can invoke a middleware interface and, by invoking the interface, install the extraction algorithm corresponding to the client into the middleware (e.g., loading a plug-in or a library into the middleware process). The middleware thus receives the extraction algorithm that corresponds to the client and was injected by the client, and stores the extraction algorithm.

Of course, the extraction algorithms corresponding to the various clients stored in the middleware can also be stored in the middleware when the equipment where the middleware is located is shipped from the factory. If the middleware is hardware (e.g., a chip), the extraction algorithm corresponding to the client can be hardwired into the hardware at the time of equipment manufacture. Other extraction algorithms can also be stored in the hardware. If the middleware is software independent of other clients, then the software can be pre-installed in the equipment at the time of equipment manufacture, and the extraction algorithms corresponding to various clients can be stored in this software. Other extraction algorithms can also be stored in the software.

In some embodiments, all equipment, whether cell phones, PCs, or other equipment, is to have a trust zone chip for storing secure and sensitive information of the user. Therefore, in some embodiments, the trust zone chip and its associated software and/or firmware in the equipment is regarded as the middleware. Extraction algorithms corresponding to the various clients can be hardwired into the trust zone chip when the equipment is shipped from the factory, or the client can invoke an interface for this trust zone chip and install the extraction algorithms through the invoked interface of the trust zone chip.

Figure 1B:
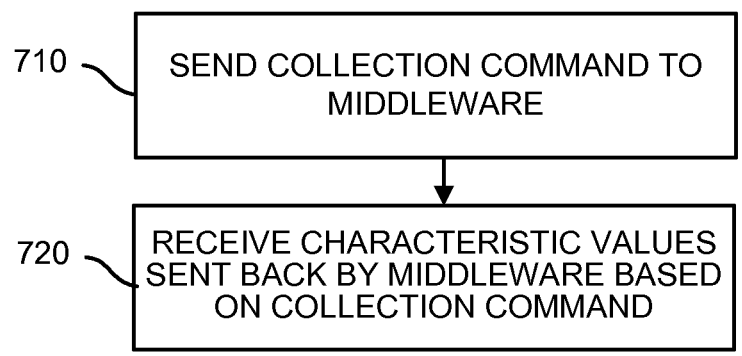
FIG. 1B is a flow diagram illustrating another embodiment of a process for extracting characteristic information.

FIG. 1B is a flow diagram illustrating another embodiment of a process for extracting characteristic information. In some embodiments, the process 700 is implemented by the client 2210 of FIG. 2. The process 700 comprises:

In 710, the client sends a collection command to middleware.

In 720, the client receives characteristic values sent back by the middleware based on the collection command. In some embodiments, the characteristic values are extracted by the middleware based on a stored extraction algorithm corresponding to biometric information collected by a collection device.

In some embodiments, before receiving the characteristic values sent back by the middleware based on the collection command, the client invokes an interface (e.g., an application program interface) of the middleware and, by the invoked interface, installs the extraction algorithm corresponding to the client into the middleware.

Figure 2:
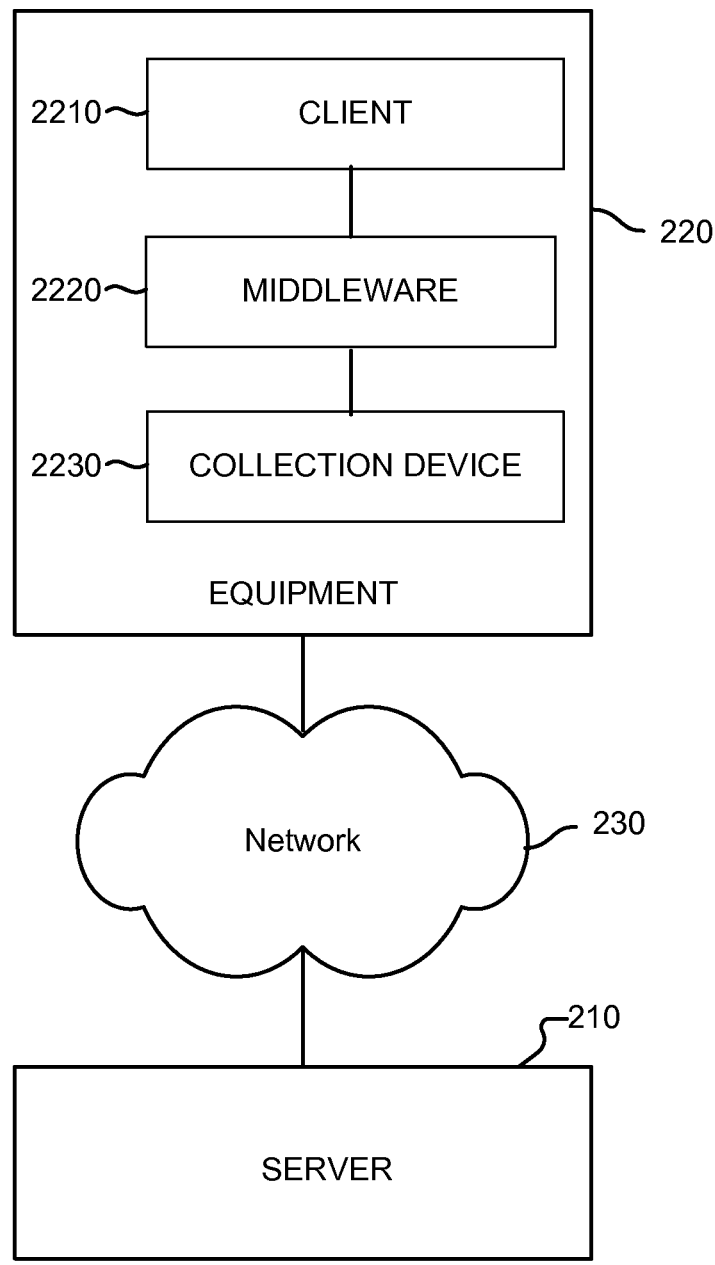
FIG. 2 is a diagram illustrating an embodiment of a system for extracting characteristic information.

FIG. 2 is a diagram illustrating an embodiment of a system for extracting characteristic information. In some embodiments, the system 200 implements the process 100 of FIG. 1A and the process 700 of FIG. 1B, and includes a server 210 and an equipment 220 including a client 2210, middleware 2220, and a collection device 2230. In some embodiments, the server 210 is connected to the equipment 220 via a network 230.

When the client 2210 is to use biometric information, the client 2210 sends a collection command to the middleware 2220. The middleware 2220 takes the collection command and sends the collection command to the collection device 2230. The collection device 2230 then collects biometric information and sends the biometric information to the middleware 2220. The middleware 2220 selects an extraction algorithm corresponding to the client 2210 and extracts, via the extraction algorithm, characteristic values from the biometric information that the middleware 2220 received. The middleware 2220 sends the extracted characteristic values back to the client 2210, and the client 2210 sends these characteristic values to the server 210 to verify the characteristic values or perform other operations.

Figure 3:
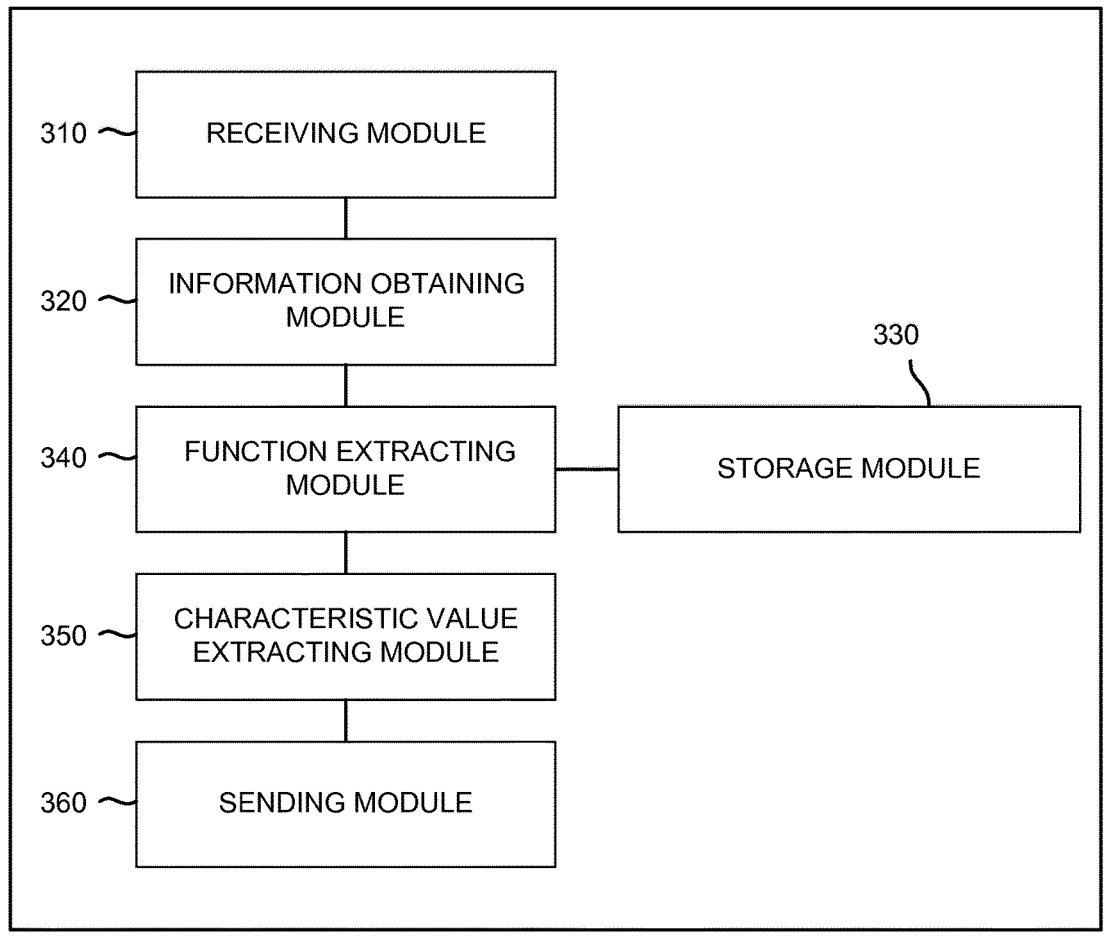
FIG. 3 is a structural diagram illustrating an embodiment of middleware for extracting characteristic information.
Figure 4:
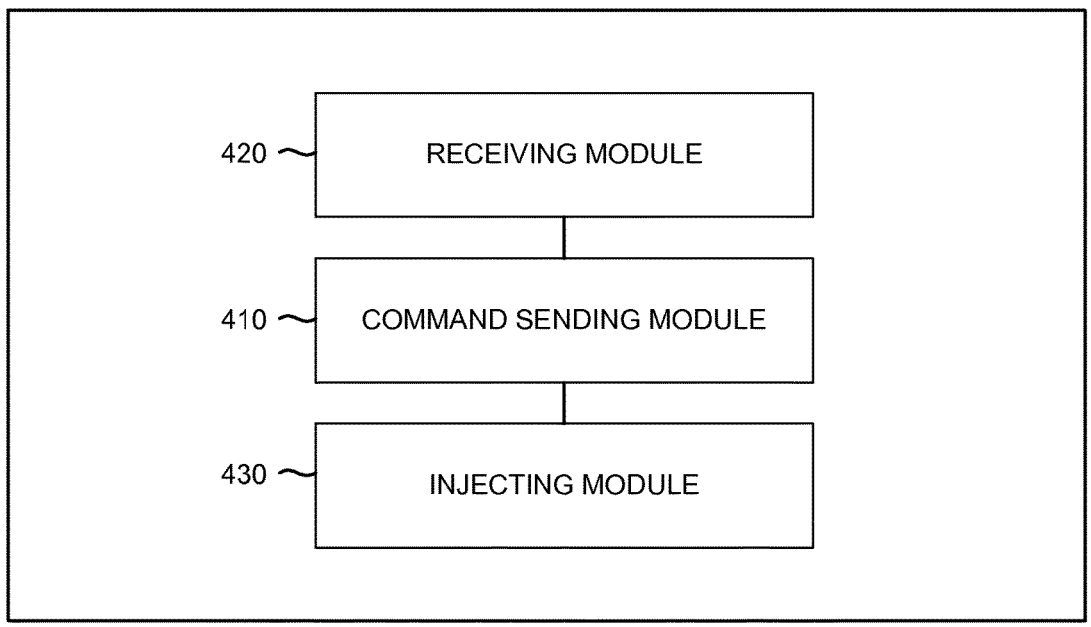
FIG. 4 is a structural diagram illustrating an embodiment of a client for extracting characteristic information.
Figure 5:
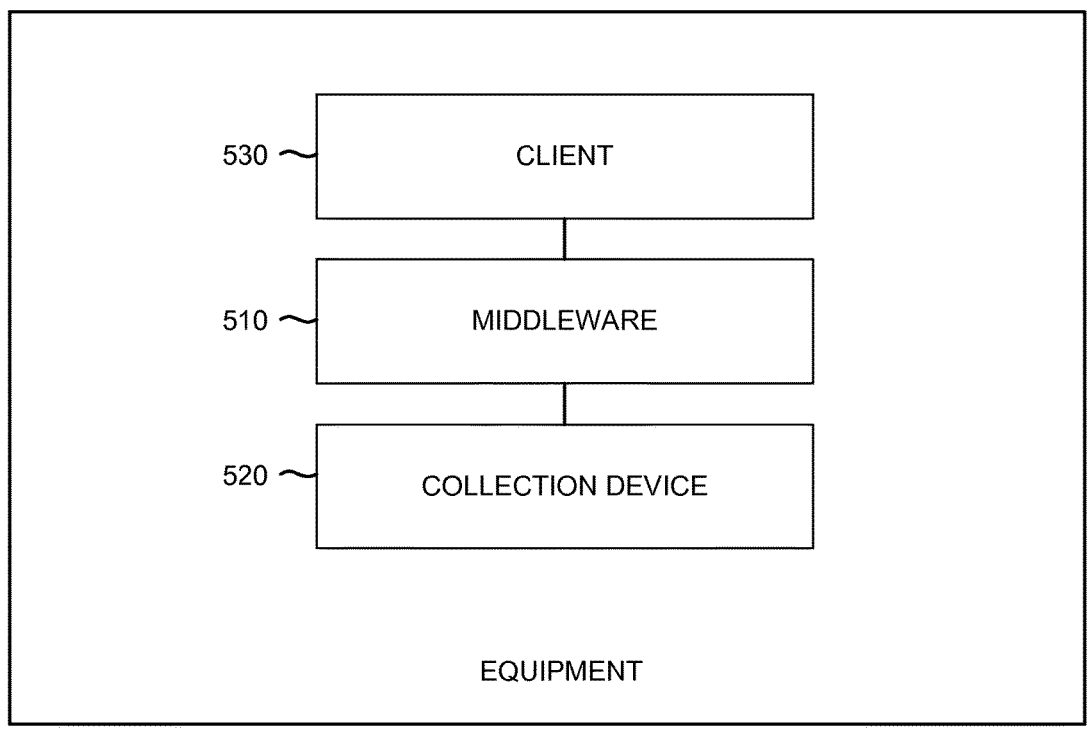
FIG. 5 is a structural diagram illustrating an embodiment of equipment for extracting characteristic information.

Embodiments of middleware, a client, and equipment for extracting characteristic information are illustrated in FIGS. 3, 4 and 5, respectively.

FIG. 3 is a structural diagram illustrating an embodiment of middleware for extracting characteristic information. In some embodiments, the middleware 300 corresponds to the middleware 2220 of FIG. 2 and includes a receiving module 310, an information obtaining module 320, a storage module 330, a function extracting module 340, a characteristic value extracting module 350, and a sending module 360.

In some embodiments, the receiving module 310 receives a collection command from a client.

In some embodiments, the information obtaining module 320 obtains, via a collection device, biometric information based on the collection command.

In some embodiments, the storage module 330 stores various extraction algorithms.

In some embodiments, the function extracting module 340 selects, from among the various extraction algorithms stored in the storage module 330, a stored extraction algorithm corresponding to the client.

In some embodiments, the characteristic value extracting module 350 extracts characteristic values from the biometric information based on the selected extraction algorithm.

In some embodiments, the sending module 360 sends the extracted characteristic values to the client.

In some embodiments, the information obtaining module 320 sends the collection command to the collection device and receives the biometric information collected by the collection device after the collection device receives the collection command.

In some embodiments, the function extracting module 340 selects a stored extraction algorithm corresponding to identifying information of the client. In some embodiments, the identifying information of the client is included in the received collection command.

In some embodiments, the storage module 330 acquires an extraction algorithm corresponding to the client upon detecting an installation of the client onto the equipment where the middleware is located and stores the extraction algorithm.

In some embodiments, the receiving module 310, upon receiving the collection command sent by the client and determining that no extraction algorithm corresponding to the client has been stored, acquires an extraction algorithm corresponding to the client and stores the extraction algorithm, or receives an extraction algorithm that corresponds to the client and was injected by the client and stores the extraction algorithm. In some embodiments, the client, by invoking an interface of the storage module 330, installs the extraction algorithm onto the storage module 330 via the invoked interface.

FIG. 4 is a structural diagram illustrating an embodiment of a client for extracting characteristic information. In some embodiments, the client 400 corresponds to the client 2210 of FIG. 2 and comprises a command sending module 410, a receiving module 420, and an injecting module 430.

In some embodiments, the command sending module 410 sends collection commands to middleware.

In some embodiments, the receiving module 420 receives characteristic values sent back by the middleware based on the sent collection command. In some embodiments, the characteristic values were, based on a stored extraction algorithm corresponding to the client, extracted, via the middleware, from biometric information collected by a collection device.

In some embodiments, the injecting module 430, before the receiving module 420 receives the characteristic values sent back by the middleware based on the collection command, invokes an interface of the middleware and, by the invoked interface, installs the extraction algorithm corresponding to the client into the middleware.

FIG. 5 is a structural diagram illustrating an embodiment of equipment for extracting characteristic information. In some embodiments, the equipment 500 corresponds to the equipment 220 of FIG. 2 and comprises middleware 510, a collection device 520, and a client 530.

In some embodiments, the client 530 sends a collection command to the middleware 510 and receives characteristic values sent back by the middleware 510 based on the collection command.

In some embodiments, the middleware 510 receives the collection command sent by the client 530, obtains biometric information based on the collection command using the collection device 520, selects, from among the various stored extraction algorithms, the stored extraction algorithm corresponding to the client 530, extracts, based on the selected extraction algorithm, the characteristic values from the biometric information, and sends the extracted characteristic values to the client 530.

In some embodiments, the collection device 520 collects the biometric information and sends the biometric information back to the middleware 510.

In some embodiments, the equipment of FIG. 5 corresponds to, but is not limited to, a cell phone, a tablet computer, a PC, a notebook computer, etc.

Figure 6:
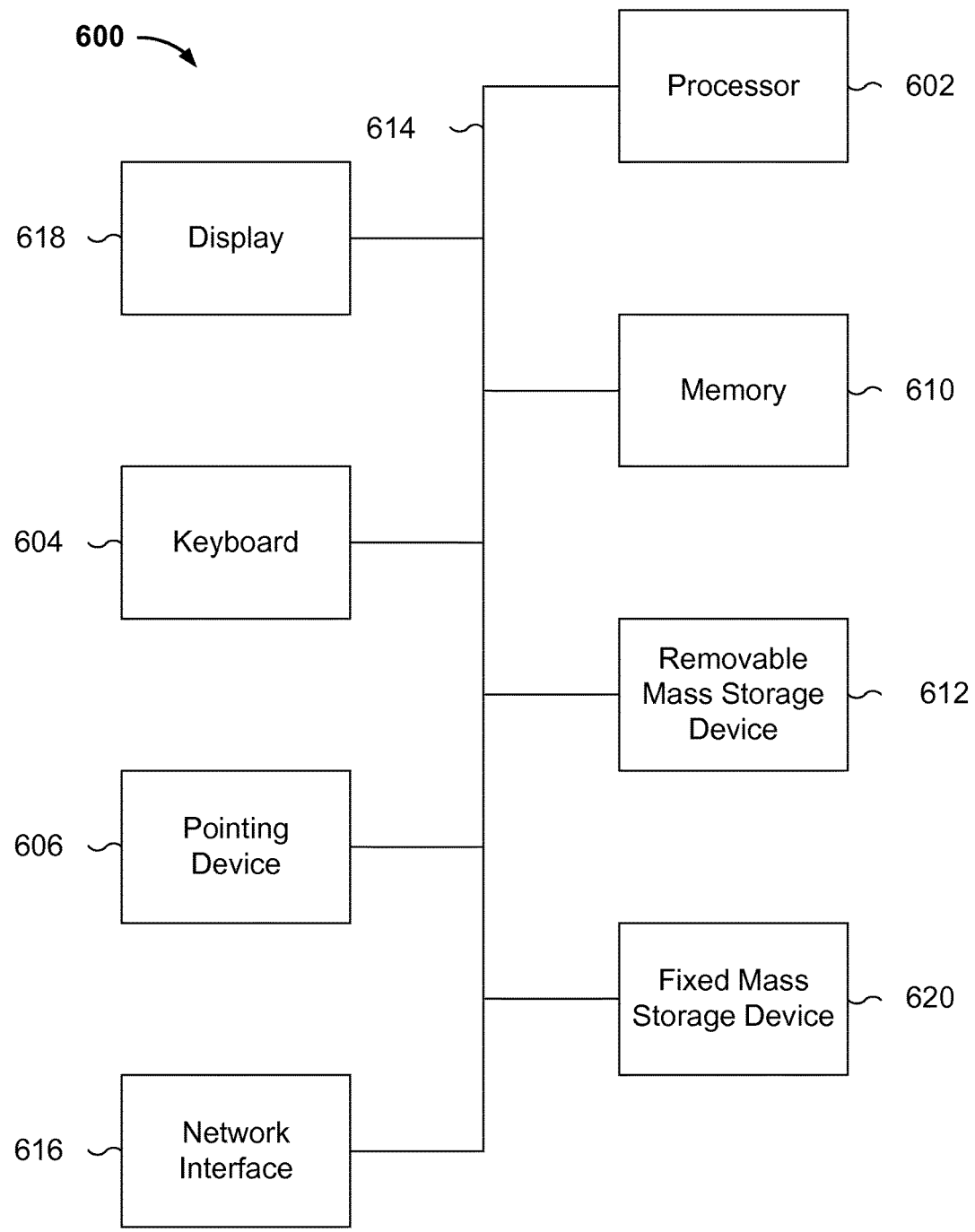
FIG. 6 is a structural diagram illustrating an embodiment of a computer system for extracting characteristic information.

FIG. 6 is a structural diagram illustrating an embodiment of a computer system for extracting characteristic information. As will be apparent, other computer system architectures and configurations can be used to extract characteristic information. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Embodiments of a method and system for extracting characteristic information are provided. In some embodiments, the middleware of the equipment receives a collection command sent by a client installed in the equipment and obtains biometric information from the equipment's collection device. The middleware then selects a stored extraction algorithm corresponding to the client. Lastly, the middleware extracts, based on the selected extraction algorithm, characteristic values of the biometric information and sends these characteristic values to the client. Based on the above method and system, the extraction algorithm implemented by the middleware when extracting the characteristic values is the extraction algorithm corresponding to the client. Therefore, the characteristic values extracted by the same client from the same biometric information through different pieces of equipment will be the same. Thus, the user can transact business based on their own biometric information on different pieces of equipment without having to reset their stored characteristic values. The embodiments of the method and system increase the efficiency with which the user conducts business and conserves network resources.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
acquire and store, in response to an activity associated with a client, an extraction algorithm corresponding to the client;
receive a collection command from the client, wherein the collection command includes client identifying information, and wherein the client identifying information comprises at least one of: a serial number of a client equipment, a client equipment manufacturer, and a type of client equipment;
obtain, via a collection device, biometric information based on the collection command;
use the client identifying information to select, from a plurality of stored extraction algorithms, an extraction algorithm corresponding to the client, wherein selecting the extraction algorithm corresponding to the client comprises:
determining the extraction algorithm corresponding to the client identifying information;
determining whether the client identifying information is associated with a first client identifying information or a second client identifying information, the first client identifying information being associated with a first client, the second client identifying information being associated with a second client, the first client being different from the second client, and the first client identifying information being different from the second client identifying information; and
selecting either a first extracting algorithm or a second extracting algorithm depending on whether the client identifying information is associated with the first client or the second client, respectively, wherein the selecting of either the first extracting algorithm or the second extracting algorithm comprises:
determining whether a middleware of the client has the extraction algorithm; and
in response to a determination that the middleware of the client does not have the extraction algorithm:
acquiring, using the middleware, the extraction algorithm based on the client identifying information; and
storing, using the middleware, the acquired extraction algorithm;
extract characteristic values from the biometric information, the characteristic values being extracted based on the selected extraction algorithm; and
send the extracted characteristic values to the client, wherein the client authenticates a user based on the extracted characteristic values.

2. The system as described in claim 1, wherein the processor is further configured to:
send the collection command to the collection device; and
receive the biometric information collected by the collection device after the receiving of the collection command.

3. A method, comprising:
acquiring and storing, in response to an activity associated with a client, an extraction algorithm corresponding to the client;
receiving a collection command from the client, wherein the collection command includes client identifying information, and wherein the client identifying information comprises at least one of: a serial number of a client equipment, a client equipment manufacturer, and a type of client equipment;
obtaining, via a collection device, biometric information based on the collection command;
using the client identifying information to select, from a plurality of stored extraction algorithms an extraction algorithm corresponding to the client, wherein selecting the extraction algorithm corresponding to the client comprises:
determining the extraction algorithm corresponding to the client identifying information;
determining whether the client identifying information is associated with a first client identifying information or a second client identifying information, the first client identifying information being associated with a first client, the second client identifying information being associated with a second client, the first client being different from the second client, and the first client identifying information being different from the second client identifying information; and
selecting either a first extracting algorithm or a second extracting algorithm depending on whether the client identifying information is associated with the first client or the second client, respectively, wherein the selecting of either the first extracting algorithm or the second extracting algorithm comprises:

determining whether a middleware of the client has the extraction algorithm; and
in response to a determination that the middleware of the client does not have the extraction algorithm:
acquiring, using the middleware, the extraction algorithm based on the client identifying information; and
storing, using the middleware, the acquired extraction algorithm;
extracting characteristic values from the obtained biometric information, the characteristic values being extracted based on the selected extraction algorithm; and
sending the extracted characteristic values to the client, wherein the client authenticates a user based on the extracted characteristic values.

4. The method as described in claim 3, wherein the obtaining of the biometric information comprises:
sending the collection command to the collection device; and
receiving the biometric information collected by the collection device after receiving the collection command.

5. A computer program product, the computer program product being embodied in a tangible non-transitory computer readable storage medium and comprising computer instructions for:
acquiring and storing, in response to an activity associated with a client, an extraction algorithm corresponding to the client;
receiving a collection command from the client, wherein the collection command includes client identifying information, and wherein the client identifying information comprises at least one of: a serial number of a client equipment, a client equipment manufacturer, and a type of client equipment;
obtaining, via a collection device, biometric information based on the collection command;
using the client identifying information to select, from a plurality of stored extraction algorithms an extraction algorithm corresponding to the client, wherein selecting the extraction algorithm corresponding to the client comprises:
determining the extraction algorithm corresponding to the client identifying information;
determining whether the client identifying information is associated with a first client identifying information or a second client identifying information, the first client identifying information being associated with a first client, the second client identifying information being associated with a second client, the first client being different from the second client, and the first client identifying information being different from the second client identifying information; and
selecting either a first extracting algorithm or a second extracting algorithm depending on whether the client identifying information is associated with the first client or the second client, respectively, wherein the selecting of either the first extracting algorithm or the second extracting algorithm comprises:
determining whether a middleware of the client has the extraction algorithm; and
in response to a determination that the middleware of the client does not have the extraction algorithm:
acquiring, using the middleware, the extraction algorithm based on the client identifying information; and
storing, using the middleware, the acquired extraction algorithm;
extracting characteristic values from the obtained biometric information, the characteristic values being extracted based on the selected extraction algorithm; and
sending the extracted characteristic values to the client, wherein the client authenticates a user based on the extracted characteristic values.

6. A system, comprising:
a processor; and
a memory coupled with the processor, wherein the memory is configured to provide the processor with instructions which when executed cause the processor to:
send a collection command to middleware, wherein the collection command includes client identifying information, and wherein the client identifying information comprises at least one of: a serial number of a client equipment, a client equipment manufacturer, and a type of client equipment; and wherein the middleware is configured to:
use the client identifying information to select, from a plurality of stored extraction algorithms, an extraction algorithm corresponding to a client, wherein the extraction algorithm corresponding to the client was acquired and stored in response to an activity associated with the client, and wherein selecting the extraction algorithm corresponding to the client comprises:
determine the extraction algorithm corresponding to the client identifying information;
determining whether the client identifying information is associated with a first client identifying information or a second client identifying information, the first client identifying information being associated with a first client, the second client identifying information being associated with a second client, the first client being different from the second client, and the first client identifying information being different from the second client identifying information; and
selecting either a first extracting algorithm or a second extracting algorithm depending on whether the client identifying information is associated with the first client or the second client, respectively, wherein the selecting of either the first extracting algorithm or the second extracting algorithm comprises:
determining whether a middleware of the client has the extraction algorithm; and
in response to a determination that the middleware of the client does not have the extraction algorithm:
acquiring, using the middleware, the extraction algorithm based on the client identifying information; and
storing, using the middleware, the acquired extraction algorithm;
extract characteristic values from biometric information obtain by the client based on the selected extraction algorithm; and
send the extracted characteristic values to a client;
receive the characteristic values sent back by the middleware based on the collection command, wherein the characteristic values were extracted by the middleware based on the stored extraction algorithm and correspond to biometric information collected by a collection device; and
authenticate a user based on the received characteristic values.

7. A method, comprising:
sending a collection command to middleware, wherein the collection command includes client identifying information, and wherein the client identifying information comprises at least one of: a serial number of a client equipment, a client equipment manufacturer, and a type of client equipment; and wherein the middleware is configured to:
use the client identifying information to select, from a plurality of stored extraction algorithms, an extraction algorithm corresponding to a client, wherein the extraction algorithm corresponding to the client was acquired and stored in response to an activity associated with the client, and wherein selecting the extraction algorithm corresponding to the client comprises:
determining the extraction algorithm corresponding to the client identifying information;
determining whether the client identifying information is associated with a first client identifying information or a second client identifying information, the first client identifying information being associated with a first client, the second client identifying information being associated with a second client, the first client being different from the second client, and the first client identifying information being different from the second client identifying information; and
selecting either a first extracting algorithm or a second extracting algorithm depending on whether the client identifying information is associated with the first client or the second client, respectively, wherein the selecting of either the first extracting algorithm or the second extracting algorithm comprises:
determining whether a middleware of the client has the extraction algorithm; and
in response to a determination that the middleware of the client does not have the extraction algorithm:
acquiring, using the middleware, the extraction algorithm based on the client identifying information; and
storing, using the middleware, the acquired extraction algorithm;
extract characteristic values from biometric information obtain by the client based on the selected extraction algorithm; and
send back the extracted characteristic values;
receiving the characteristic values sent back by the middleware based on the collection command, wherein the characteristic values were extracted by the middleware based on the stored extraction algorithm and correspond to biometric information collected by a collection device; and
authenticating a user based on the received characteristic values.

8. A computer program product, the computer program product being embodied in a tangible non-transitory computer readable storage medium and comprising computer instructions for:

sending a collection command to middleware, wherein the collection command includes client identifying information, and wherein the client identifying information comprises at least one of: a serial number of a client equipment, a client equipment manufacturer, and a type of client equipment; and wherein the middleware is configured to:
use the client identifying information to select, from a plurality of stored extraction algorithms, an extraction algorithm corresponding to a client, wherein the extraction algorithm corresponding to the client was acquired and stored in response to an activity associated with the client, and wherein selecting the extraction algorithm corresponding to the client comprises:
determining the extraction algorithm corresponding to the client identifying information;
determining whether the client identifying information is associated with a first client identifying information or a second client identifying information, the first client identifying information being associated with a first client, the second client identifying information being associated with a second client, the first client being different from the second client, and the first client identifying information being different from the second client identifying information; and
selecting either a first extracting algorithm or a second extracting algorithm depending on whether the client identifying information is associated with the first client or the second client, respectively, wherein the selecting of either the first extracting algorithm or the second extracting algorithm comprises:
determining whether a middleware of the client has the extraction algorithm; and
in response to a determination that the middleware of the client does not have the extraction algorithm:
acquiring, using the middleware, the extraction algorithm based on the client identifying information; and
storing, using the middleware, the acquired extraction algorithm;
extract characteristic values from biometric information obtain by the client based on the selected extraction algorithm; and
extract characteristic values from biometric information obtain by the client based on the selected extraction algorithm; and
send back the extracted characteristic values;
receiving the characteristic values sent back by the middleware based on the collection command, wherein the characteristic values were extracted by the middleware based on the stored extraction algorithm and correspond to biometric information collected by a collection device; and
authenticating a user based on the received characteristic values.

9. The system as described in claim 1, wherein the identifying information includes a serial number of a chip associated with the client.

10. The system as described in claim 1 wherein the client is installed on a first device, and wherein the client is configured to transmit the extracted characteristic values to a remote server, and wherein the remote server is configured to store the extracted characteristic values and provide the extracted characteristic values to a second device for authentication of a user.

* * * * *